(12) United States Patent
Monzie

(10) Patent No.: US 8,485,365 B2
(45) Date of Patent: Jul. 16, 2013

(54) FLUID FILTER

(75) Inventor: Benoît Monzie, Stuttgart (DE)

(73) Assignee: Mahle International GmbH (DE)

( * ) Notice: Subject to any disclaimer, the term of this patent is extended or adjusted under 35 U.S.C. 154(b) by 468 days.

(21) Appl. No.: 12/809,270

(22) PCT Filed: Oct. 17, 2008

(86) PCT No.: PCT/EP2008/064061
§ 371 (c)(1),
(2), (4) Date: Jun. 18, 2010

(87) PCT Pub. No.: WO2009/083285
PCT Pub. Date: Jul. 9, 2009

(65) Prior Publication Data
US 2011/0036766 A1    Feb. 17, 2011

(30) Foreign Application Priority Data
Dec. 21, 2007   (DE) .................. 10 2007 062 221

(51) Int. Cl.
*F01M 11/03*    (2006.01)
*B01D 35/153*   (2006.01)
*B01D 24/00*    (2006.01)
*B01D 35/00*    (2006.01)
*F02M 37/22*    (2006.01)

(52) U.S. Cl.
USPC ...... 210/437; 210/167.02; 210/235; 210/248; 210/416.4; 210/DIG. 17

(58) Field of Classification Search
USPC ............... 210/167.01, 232, 248, 418, 435, 210/440, 443, 416.4, 416.5, DIG. 17
See application file for complete search history.

(56) References Cited

U.S. PATENT DOCUMENTS
3,855,128  A  * 12/1974  Shaltz et al. .............. 210/130
6,706,181  B1    3/2004  Baumann et al.
(Continued)

FOREIGN PATENT DOCUMENTS
DE    29916265 U1    2/2001
DE    19951085 A1    4/2001
(Continued)

OTHER PUBLICATIONS

Spain et al., "High Pressure Technology vol. 1 Equipment Design, Materials, and Properties", 1977, p. 89.*
(Continued)

*Primary Examiner* — Nam Nguyen
*Assistant Examiner* — Claire Norris
(74) *Attorney, Agent, or Firm* — Rader, Fishman & Grauer PLLC

(57) ABSTRACT

An internal combustion engine liquid filter, comprising: a filter housing and housing cover a ring filter element; at least one intermediate piece arranged below the filter housing cover and above the housing; an inlet channel arranged on the housing side, communicating with a crude side of the ring filter element, and an outlet channel arranged on the housing side, communicating with a pure side of the ring filter element; a drainage channel on the housing side, wherein the housing space drains through the drainage channel when removing the filter housing cover; and a closure mechanism arranged in the intermediate piece and the closure mechanism is rotatable about a filter axis, wherein the closure mechanism has a closure element for closing the drainage channel.

20 Claims, 3 Drawing Sheets

U.S. PATENT DOCUMENTS

| | | | |
|---|---|---|---|
| 6,936,169 B2 * | 8/2005 | Baumann et al. | 210/497.01 |
| 7,390,407 B2 | 6/2008 | Weindorf et al. | |
| 7,820,044 B2 | 10/2010 | Nawa et al. | |

FOREIGN PATENT DOCUMENTS

| | | |
|---|---|---|
| EP | 0322828 A1 | 7/1989 |
| EP | 1419809 A1 | 5/2004 |
| EP | 1674142 A1 | 6/2006 |
| JP | 11179111 A | 7/1999 |
| JP | 2007-154765 A | 6/2007 |
| WO | WO-2006012031 A1 | 2/2006 |

OTHER PUBLICATIONS

English abstract provided for EP-0322828.
English abstract for JP-11179111.

* cited by examiner

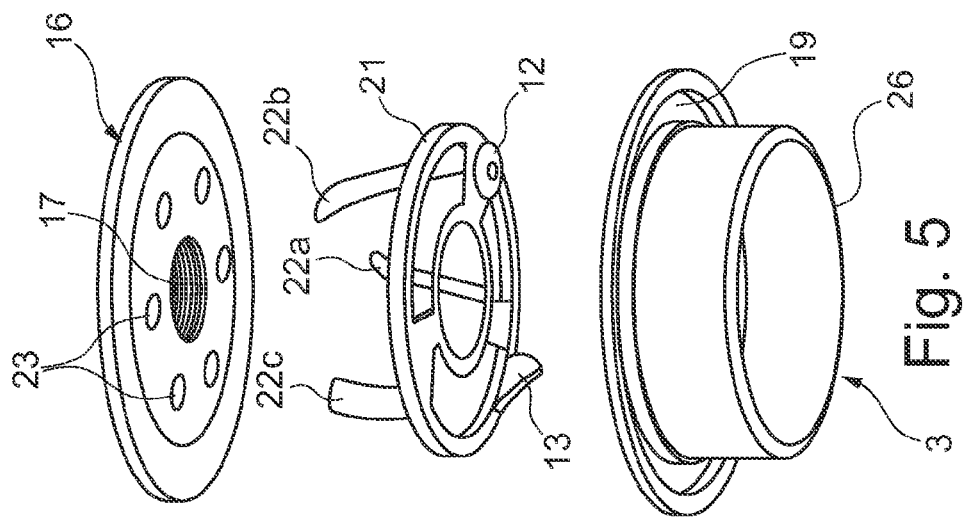
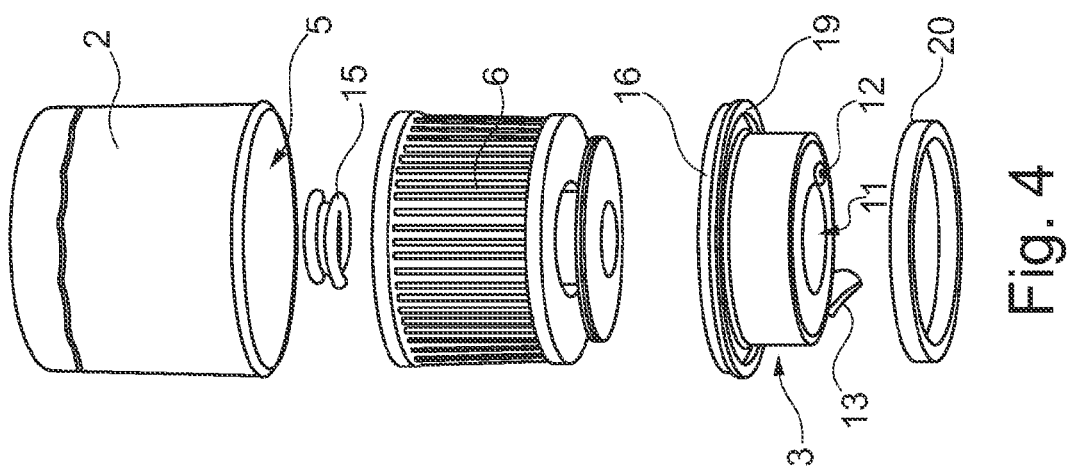
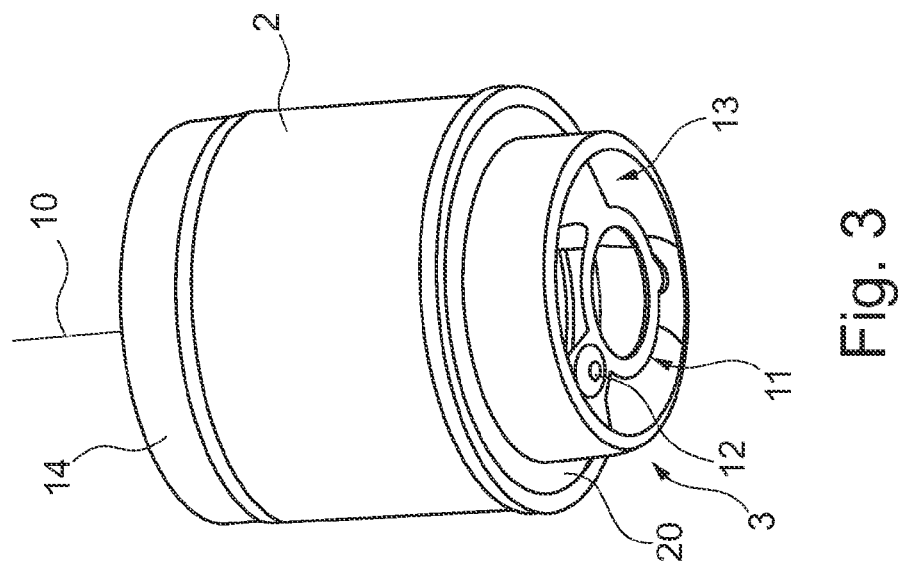

FLUID FILTER

CROSS-REFERENCES TO RELATED APPLICATIONS

This application claims priority to German patent applications DE 10 2007 062 221.1 filed on Dec. 21, 2007, and PCT/EP2008/064061 filed on Oct. 17, 2008, both of which are hereby incorporated by reference in their entirety.

TECHNICAL FIELD

The present invention relates to a liquid filter, in particular an oil filter for cleaning lubricating oil for internal combustion engines of motor vehicles.

BACKGROUND

Liquid filters, in particular oil filters, typically have a so-called ring filter element by means of which a liquid is filtered which flows through the liquid filter. Said filter element has to be replaced according to a schedule to be able to ensure the filter effect of the liquid filter at all times. During replacement of the ring filter element, the liquid filter is opened, for example, by removing a filter housing cover so as to provide access to the ring filter element. Due to the constantly increasing environmental requirements, the replacement of the filter element must be possible without liquid, in particular oil, escaping into the environment. For this reason, conventional liquid filters have a housing which comprises, besides an inlet channel which communicates with the crude side of the ring filter element, and an outlet channel which communicates with the pure side of the ring filter element, a drainage channel by means of which a housing space, in which the ring filter element is arranged, can be drained when opening the filter housing. Of course, said drainage channel has to be closed when the liquid filter is ready for operation because otherwise the pure side and the crude side of the ring filter element would be interconnected and thus, the liquid filter would not be able to develop its filter effect.

SUMMARY

The present invention is concerned with the problem to provide, for a liquid filter, an improved or at least different embodiment which allows an automatic opening or closing of a drainage channel during disassembly or assembly of a ring filter element in the liquid filter.

According to the invention, this problem is solved by the subject matter of the independent claim 1. Advantageous embodiments are subject matter of the dependent claims.

The invention is based on the general idea to provide, between a vertically arranged ring filter element and a housing which is arranged therebelow, an intermediate piece in which a closure mechanism is integrated. For this, the closure mechanism is arranged rotatably about the filter axis of the ring filter element, wherein the ring filter element itself is arranged in a housing space which is bordered by a filter housing cover. On the housing side, an inlet channel and an outlet channel are provided, wherein the inlet channel communicates with a crude side of the ring filter element and the outlet channel communicates with a pure side of the ring filter element. Also provided in the housing is a drainage channel through which the housing space can be drained when unscrewing the liquid filter housing cover so that no filter liquid, in particular no oil, can escape into the environment. The closure mechanism which is arranged rotatably about the filter axis has a closure mechanism by means of which the drainage channel can be closed when the filter housing cover is completely screwed on the housing. In general, the closure mechanism is configured in such a manner that when the filter housing cover is screwed to the housing, it is fixed in a precisely defined angle position in which the closure element is arranged in alignment with the drainage channel and, by screwing the filter to housing cover, can be moved into a position in which the drainage channel is closed. In contrast to that, the closure mechanism is rotated when the filter housing cover is unscrewed from the housing and, at the same time, is moved away from the housing in such a manner that the closure element releases the drainage channel when unscrewing the filter housing cover from the housing and allows a draining of housing space containing the ring filter element. By means of the closure mechanism according to the invention which, for example, can be formed as a cost-effective sheet metal stamping with a closure element made of plastic, it is possible in the simplest technical manner to close the drainage channel in a reliable manner when the filter housing cover is completely screwed to the housing, thereby ensuring a proper function of the liquid filter, wherein during unscrewing the filter housing cover from the housing, the drainage channel is automatically opened in such a manner that the housing space for the ring filter element can drain and no filter liquid can escape into the environment. A separate opening or closing of the drainage channel, in connection with the possibility to forget about this, can be reliably excluded by the liquid filter according to the invention, whereby the maintenance process can be handled considerably safer and user-friendlier. Moreover, by means of the rotational angle position of the closure mechanism, which position is precisely fixed when the filter housing cover is screwed to the housing, a complicated positioning or aligning of the closure element with respect to the drainage channel to be closed can be eliminated, wherein it is always ensured that the drainage channel is reliably closed when the filter housing cover is completely screwed to the housing.

Advantageously, the closure mechanism is configured as disk spring and has a ramp-like mandrel which is facing the housing and which engages in the inlet channel on the housing side when screwing on the filter housing cover and which thereby is fixed with respect to its rotational angle position in such a manner that the closure element is aligned with the drainage channel and, by further screwing on the filter housing cover, can be moved into its position which closes the drainage channel. During screwing on, the ramp-like or tapered mandrel ensures that the mandrel gets locked in an opening of the inlet channel and thereby prevents a further rotational movement of the closure mechanism. In the locked position, the closure mechanism is fixed in such a rotational angle position in which the closure element is aligned in a precisely fitting manner with the opening of the drainage channel. If the filter housing cover is further screwed on, a solely axial movement of the closure element toward the drainage channel takes place until the closure element rests against an opening of the drainage channel or engages in such an opening in such a manner that the drainage channel is closed. In particular in case of a closure mechanism which is configured as a sheet metal stamping, the ramp-like mandrel can be manufactured in the same simple manner as the closure mechanism itself.

In a further advantageous embodiment of the solution according to the invention, between the intermediate piece and ring filter element arranged thereabove, a disk-like bottom is provided which has a plurality of through-openings distributed in circumferential direction, wherein the through-openings are arranged on the same radial circumferential path as the free ends of cantilever arms which project in the direction of the ring filter and which are arranged on the closure mechanism. The free ends of the cantilever arms are bent-up in a skid-like or ski-like manner and allow a sliding across the through-opening of the disk-like bottom when screwing the filter housing cover to the housing, whereas the free ends of the cantilever arms are getting locked in the through-openings when unscrewing the filter housing cover from the housing, thereby forcing a concurrent rotation of the closure mechanism. The concurrent rotation of the closure mechanism when unscrewing the filter housing cover from the housing causes a sliding of the ramp-like mandrel out of the inlet channel and thus an axial movement of the closure mechanism together with the closure element so that the closure element releases the opening of the drainage channel. Thus, the closure mechanism acts completely different during the screwing process or unscrewing process of the filter housing to/from the housing, respectively. When screwing the filter housing cover to the housing, the closure mechanism, that is, the cantilever arms, which are flexible and which project in the direction of the ring filter element, are compressed until the closure element arranged on the closure mechanism abuts tightly on or in the drainage channel. Thereby, a reliable closing of the drainage channel can be achieved when screwing the filter housing cover to the housing and a reliable opening can be achieved when unscrewing the filter housing cover from the housing, and thus a draining of the housing space. This ensures, on the one hand, a high functional safety of the liquid filter and, on the other hand, a discharge of filter liquid into the environment can reliably be avoided since the drainage channel is already open after a few rotations of the filter housing cover in such a manner that the housing space can completely drain before the filter housing cover is removed.

Further important features and advantages arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the scope of the present invention.

BRIEF DESCRIPTION OF THE DRAWING

Preferred exemplary embodiments of the invention are illustrated in the drawings and are explained in the following description in more detail, wherein identical reference numbers refer to identical, or similar, or functionally identical components.

In the figures:

FIG. 3 shows schematically a filter housing cover with an intermediate piece mounted thereon, FIG. 4 shows schematically an exploded illustration according to FIG. 3, FIG. 5 shows schematically an exploded view of the intermediate piece with a closure mechanism integrated therein, and with a disk-like bottom.

DETAILED DESCRIPTION

Figure 1:
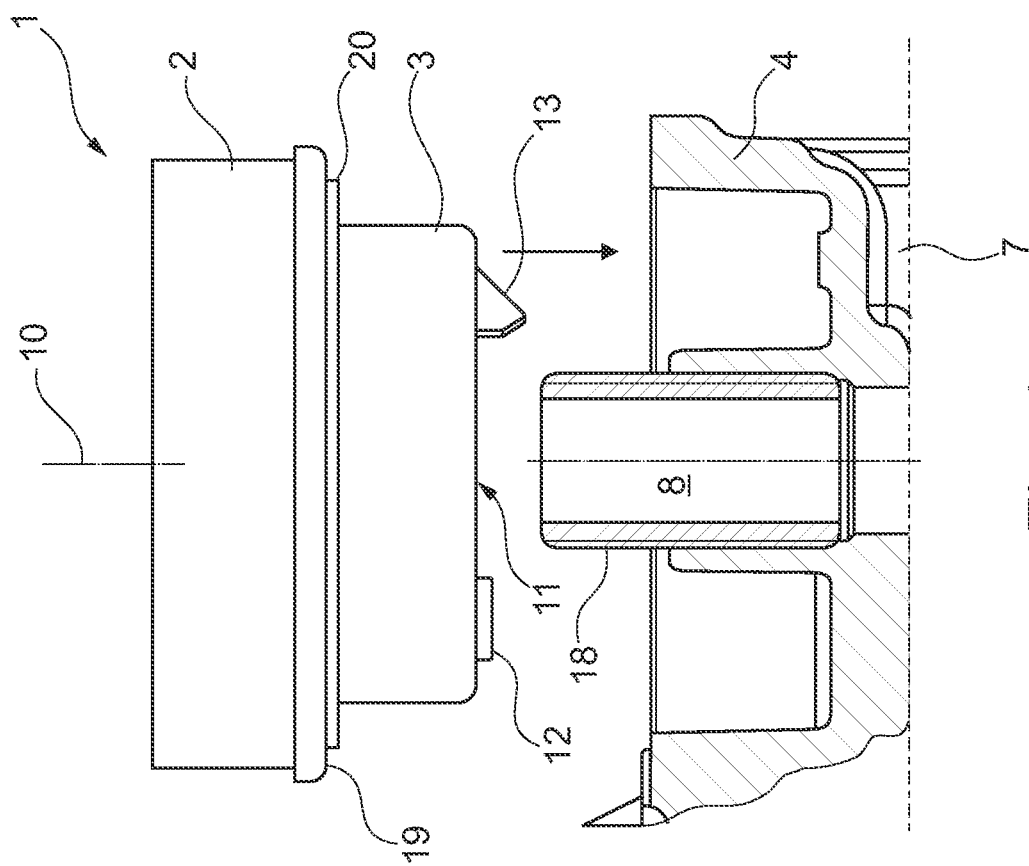
FIG. 1 shows schematically a liquid filter according to the invention together with a sectional view of a housing.

According to FIG. 1, a liquid filter 1 according to the invention has a filter housing cover 2 which is shown partially only and which has an intermediate piece 3 arranged therebelow. Also comprised by the liquid filter 1 is a housing 4 which is shown according to FIG. 1 in a sectional view and which can be screwed by means of a screw connection 18 to the unit formed from filter housing cover and intermediate piece 3. The filter housing cover 2 borders a housing space 5, which is illustrated according to FIG. 4, for a ring filter element 6. As is further shown in FIG. 1, the intermediate piece 3 is arranged between the filter housing cover 2 and the housing 4, wherein in the housing space 5, as shown, for example, in FIG. 4, the ring filter element 6 is arranged in a vertical position.

To ensure a supply and discharge of filter liquid to and from the liquid filter 1, at least one inlet channel 7 and one outlet channel 8 are provided in the housing 4. The inlet channel 7 on the housing side communicates with a crude side of the ring filter element 6 while the outlet channel 8 on the housing side is connected in a communicating manner with a pure side of the ring filter element 6.

Figure 2:
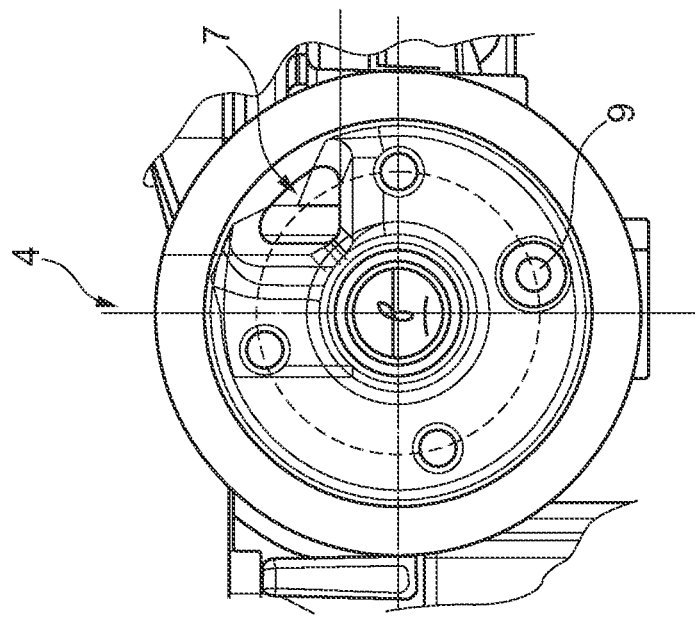
FIG. 2 shows schematically a top view of a housing of the liquid filter.

To be able to prevent that filter liquid can escape into the environment when changing the ring filter element 6—for which reason the filter cover 2 must be unscrewed—additionally, a drainage channel 9 (cf. FIG. 2) is provided within the housing 4, which drainage channel connects the housing space 5 with a liquid reservoir, thereby allowing a draining of the housing space 5 preferably before the filter housing cover 2 is completely unscrewed. Of course, said drainage channel 9 must be closed when the liquid filter 1 is ready for operation because otherwise an interconnection between pure side and crude side and thus a negative impact on the functionality of the liquid filter 1 would take place. To close the drainage channel 9 during the operation of the liquid filter 1 and to be able to reliably open it when replacing the ring filter element 6, a closure mechanism 11 is provided in the intermediate piece 3, which closure mechanism is arranged rotatably about the filter axis 10 and which has a closure element 12 by means of which the drainage channel 9 can be closed when the liquid filter 1 is completely mounted.

To be able, on the one hand, to reliably close the drainage channel 9 when the liquid filter 1 is ready for operation and, on the other hand, to open it early when unscrewing the filter housing cover 2, and thus to allow a draining of the housing space 5, the closure mechanism 11 is configured in such a manner that when the filter housing cover 2 is screwed to the housing 4, it is fixed in a precisely defined rotational angle position in which the closure element 12 is arranged in alignment with the drainage channel 9 and, by screwing on the filter housing cover 2, can be moved into a position which closes the drainage channel 9. However, when unscrewing the filter housing cover 2 from the housing 4, the closure mechanism 11 is rotated and, at the same time, is moved axially away from the housing 4 such that the closure element 12 releases the drainage channel 9 early and allows a draining of the housing space 5 so that no filter liquid can escape unintentionally into the environment. The fixation of the closure mechanism 11 in the predefined rotational angle position when screwing the filter housing cover 2 onto the housing 4 is achieved by a ramp-like mandrel 13 which projects axially in the direction of the housing 4 and which engages in the inlet channel 7 when the filter housing cover 2 is screwed onto the housing 4 and thereby prevents the closure mechanism 11 from rotating.

Figure 7:
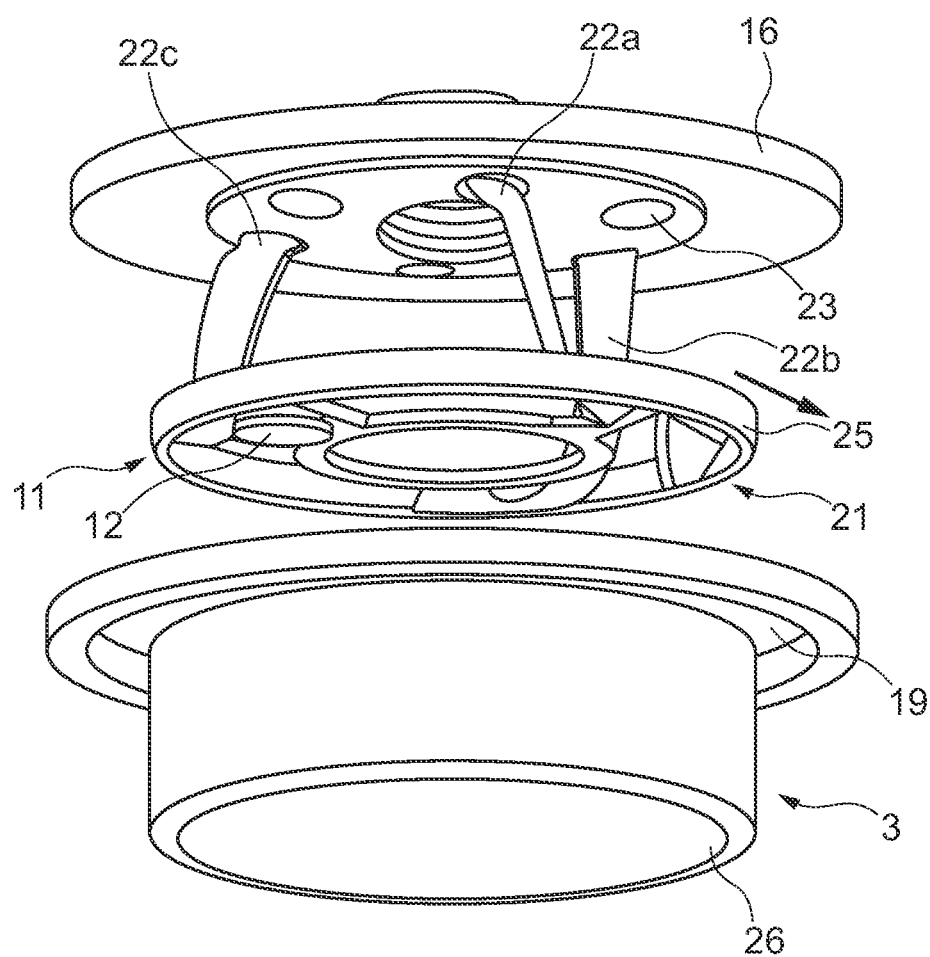
FIG. 7 shows schematically a basic diagram for clarification of the principle of operation of the closure mechanism.

According to FIG. 4, the unit consisting of filter housing cover 2 and intermediate piece 3 is internally structured as follows:

The filter housing cover 2 borders the housing space 5 in which the ring filter element 6 is arranged. With respect to an end wall 14 of the filter housing cover 2, the ring filter element 6 is elastically supported by a spring 15. Between the ring filter element 6 and the intermediate piece 3, a disk-like bottom 16 (cf. FIGS. 4, 5 and 7) is provided which, for example, can have a central internal thread 17 by means of which it can be screwed to the external thread 18 which is formed complementary thereto at the outlet channel 8. Within the intermediate piece 3, the rotatably mounted closure mechanism 11 is arranged, wherein, in addition, a circumferential groove 19 is provided on the intermediate piece 3, which groove is open in axial direction and in which a sealing element 20 is arranged which seals the intermediate piece 3 against the housing 4.

The closure mechanism 11 itself consists substantially of a spring plate 21 which includes the ramp-like mandrel 13 which projects axially in the direction of the housing 4, and at least three flexible cantilever arms 22a, 22b and 22c which project in the direction of the ring filter element 6 and which are arranged on a common circumferential path. The cantilever arms 22a, 22b, and 22c projecting in the direction of the ring filter element 6 are configured to be inclined toward the filter axis 10, in particular to be inclined in circumferential direction, wherein their free ends are preferably configured in a skid-like angled manner (cf. in particular FIG. 6). The disk-like bottom 16 which is arranged between the intermediate piece 3 and the ring filter element 6 includes a plurality of through-openings 23 distributed in circumferential direction on a circumferential path, which through openings are arranged on the same radial circumferential path as the free ends of the cantilever arms 22a, 22b and 22c.

As already mentioned above, when screwing the filter housing cover 2 to the housing 4, an engaging of the mandrel 13 into the inlet channel 7 and thus a rotational angle fixation of the closure mechanism 11 takes place. By means of the skid-like bent free ends of the cantilever arms 22a, 22b and 22c, the same slide across the through-openings 23 during screwing on without getting locked therein. When screwing the filter housing cover 2 onto the housing 4, the closure mechanism 11 is axially compressed, that is, the cantilever arms 22a, 22b and 22c are resiliently bent in the direction of the spring plate 21, wherein in each screwing position of the filter housing cover 2, the cantilever arms 22a, 22b and 22c rest against the disk-like bottom 16 and the ramp-like mandrel 13 rests against the housing 4. When unscrewing the filter housing cover 2 from the housing 4, however, the free ends of the cantilever arms 22a, 22b and 22c get locked in the through-openings 23 of the bottom 16 and thus force the closure mechanism 11 to rotate. Said rotation of the closure mechanism 11 results in that the ramp-like mandrel is moved out of the inlet channel 7 and thus, that the closure mechanism 11 together with the closure element 12 is axially moved in the direction of the ring filter element 6. This axial movement causes that the closure element 12 moves away from or out of the drainage channel 9, whereupon the same is opened and the housing space 5 can be drained through the drainage channel 9. The screw thread between filter housing cover 2 or bottom 16 and housing 4 has enough thread turns that during a normal unscrew process, the filter housing cover 2 is only lifted at a time when it is certain that the housing space 5 is drained already through the drainage channel 9 and thus an unintended leakage of filter liquid into the environment can be reliably prevented.

The spring plate 21 can be made, for example, of metal or plastic, in particular configured as a sheet metal formed part, whereas the closure element 12 is preferably formed from lubricating oil-resistant plastic.

Figure 6:
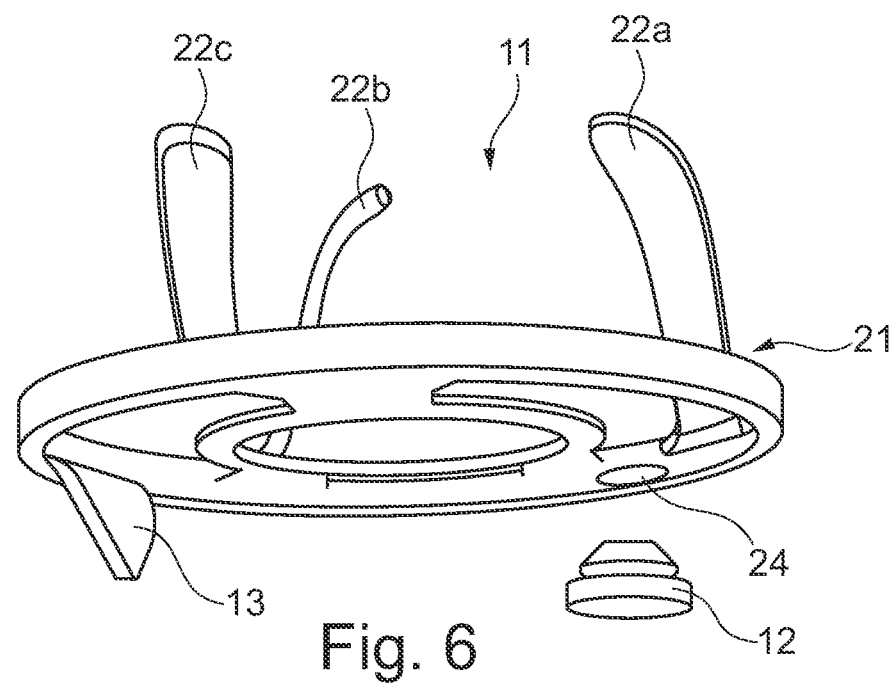
FIG. 6 shows schematically a view onto the closure mechanism with closure element.

As is shown in particular in FIG. 6, the descending slope of the cantilever arms 22a, 22b and 22c is formed opposing to the ascending slope of the ramp-like mandrel 13, whereby, when rotating, the closure mechanism 11 gets locked in rotational direction via the mandrel in the inlet channel 7, whereas in the opposite rotational direction, it gets locked via the free ends of the cantilever arms 22a, 22b and 22c in the through-openings 23.

The closure element 12 is preferably formed as a sealing mushroom, as is also shown in FIG. 6, and is inserted with its foot in a corresponding axial opening 24 of the spring plate 21 and thus is fixed in or at the same. The closure mechanism 11 has a guiding edge 25 which is guided in an angled, in particular inwardly drawn, edge 26 of the intermediate piece 3.

By means of the closure mechanism 11 according to the invention it is thus possible to reliably close the drainage channel 9 when the liquid filter 1 is completely mounted, but also, when replacing the ring filter element 6, to open the drainage channel as soon as the unscrew process of the filter housing cover 2 from the housing 4 begins, thereby preferably ensuring a complete draining of the housing space 5 before a removal of the filter housing cover 2 is possible. At the same time, the closure mechanism 11 is configured in a constructionally extremely simple manner and thus can be manufactured cost-effectively.

The invention claimed is:

1. An internal combustion engine liquid filter, comprising:
 a filter housing cover adjacent a housing space, within a housing and a ring filter element;
 at least one intermediate piece arranged below the filter housing cover and above the housing when the filter housing cover is attached to the housing;
 an inlet channel arranged on a housing side, wherein the inlet channel communicates with a crude side of the ring filter element, and an outlet channel arranged on the housing side, wherein the outlet channel communicates with a pure side of the ring filter element;
 a drainage channel on the housing side, wherein the housing space drains through the drainage channel when removing the filter housing cover; and
 a closure mechanism arranged in the intermediate piece and the closure mechanism is rotatable about a filter axis, wherein the closure mechanism has a closure element for closing,
 wherein the closure mechanism is configured such that when the filter housing cover is attached to the housing, it is fixed in a precisely defined rotational angle position in which the closure element is arranged in alignment with the drainage channel and, by attaching the filter housing cover, it is moved into a position to close the drainage channel, while removing filter housing cover causes the closure mechanism to rotate while it is simultaneously moved axially away from the housing such that the closure element releases the drainage channel and
 wherein the closure mechanism is configured as a spring plate, which includes a ramp like mandrel, which projects axially in the direction of the housing, and includes a plurality of flexible cantilever arms, which project in the direction of the ring filter element.

2. The liquid filter according to claim 1, wherein the closure mechanism includes at least three flexible cantilever arms, and wherein the at least three cantilever arms are arranged on a common circumferential path.

3. The liquid filter according to claim 1, wherein the spring plate engages with the ramp-like mandrel in the inlet channel on the housing side and thus is fixed with respect to its rotational angle position when attached to the housing cover, such that the closure element is aligned with the drainage channel and, by further attachment to the filter housing cover, the closure element is moved to close the drainage channel.

4. The liquid filter according to claim 1, wherein the cantilever arms projecting in the direction of the ring filter element are formed to be inclined toward the filter axis, and wherein their free end is bent-up in a skid-like manner.

5. The liquid filter according to claim 4, wherein a disk-like bottom is provided between the intermediate piece and the ring filter element, wherein the disk like bottom has a plurality of through-openings distributed in circumferential direction which are arranged on the same circumferential path as the free ends of the cantilever arms, wherein when attaching the filter housing cover to the housing the skid-like bent free ends of the cantilever arms slide across the through-openings whereas, when detaching the filter housing cover from the housing, the skid-like bent free ends of the cantilever arms get locked in the through-openings, thereby causing a concurrent rotation of the closure mechanism, and wherein the rotational movement of the closure mechanism, by the sliding of the ramp-like mandrel out of the inlet channel, causes an axial movement of the closure mechanism and thus an opening of the drainage channel.

6. The liquid filter according to claim 5, wherein when attaching the filter housing cover to the housing the cantilever arms allow an elastic axial compression of the closure mechanism wherein in each attaching position of the filter housing cover, the cantilever arms rest against the disk-like bottom, and the ramp-like mandrel rests against the housing.

7. The liquid filter according to claim 1 wherein the spring plate is formed from at least one of metal and plastic.

8. The liquid filter according to claim 4, wherein the descending slope of the cantilever arms is formed opposing to the ascending slope of the ramp-like mandrel.

9. The liquid filter according to claim 1, wherein the closure element is formed as a sealing mushroom having a foot, which closure element is inserted with its foot in a corresponding axial opening of the spring plate and thereby is fixed to the same.

10. The liquid filter according to claim 1, wherein a circumferential groove is provided on the intermediate piece, which is open in an axial direction and in which a sealing element is arranged which seals the intermediate piece against the housing.

11. The liquid filter according to claim 7, wherein the spring plate is formed from at least one of a sheet metal and an oil-resistant plastic.

12. The liquid filter according to claim 3, wherein the cantilever arms projecting in the direction of the ring filter element are formed to be inclined toward the filter axis, and wherein their free end is bent-up in a skid-like manner.

13. The liquid filter according to claim 3, wherein the spring plate is formed from at least one of metal and plastic.

14. The liquid filter according to claim 4, wherein the spring plate is formed from at least one of metal and plastic.

15. The liquid filter according to claim 5, wherein the spring plate is formed from at least one of metal and plastic.

16. The liquid filter according to claim 6, wherein the spring plate is formed from at least one of metal and plastic.

17. The liquid filter according to claim 5, wherein the descending slope of the cantilever arms is formed opposing to the ascending slope of the ramp-like mandrel.

18. The liquid filter according to claim 6, wherein the descending slope of the cantilever arms is formed opposing to the ascending slope of the ramp-like mandrel.

19. The liquid filter according to claim 7, wherein the descending slope of the cantilever arms is formed opposing to the ascending slope of the ramp-like mandrel.

20. The liquid filter according to claim 1, wherein the closure element is formed as a sealing mushroom having a foot, which is inserted with its foot in a corresponding axial opening of the spring plate and thereby is fixed to the same.

\* \* \* \* \*